United States Patent [19]
Oakes

[11] Patent Number: 5,614,696
[45] Date of Patent: Mar. 25, 1997

[54] ENVIRONMENTALLY SEALED CONNECTOR FOR USE WITH A LOAD CELL BLOCK

[75] Inventor: Bryan R. Oakes, Redmond, Wash.

[73] Assignee: Structural Instrumentation, Inc., Tukwila, Wash.

[21] Appl. No.: 264,462

[22] Filed: Jun. 23, 1994

[51] Int. Cl.⁶ .................................................. H02G 15/007
[52] U.S. Cl. ................ 174/65 G; 174/151; 174/152 G; 174/135
[58] Field of Search ...................... 174/135, 151, 174/65 R, 65 G, 152 G, 153 G

[56] References Cited

U.S. PATENT DOCUMENTS

| | | | |
|---|---|---|---|
| 2,111,419 | 3/1938 | Crotty | 174/655 S X |
| 2,161,145 | 6/1939 | Du Pree et al. | 174/65 G |
| 3,339,411 | 9/1967 | Riffie | 174/151 X |
| 4,267,401 | 5/1981 | Wilkinson | 174/151 X |
| 4,272,645 | 6/1981 | Kornatowski | 174/65 G |
| 4,454,381 | 6/1984 | Ho et al. | 174/151 |
| 4,487,386 | 12/1984 | Hehl | 248/56 |
| 4,778,949 | 10/1988 | Esterle et al. | 174/151 |
| 4,857,674 | 8/1989 | Filbert | 174/135 |
| 5,058,172 | 10/1991 | Ross et al. | 174/135 X |
| 5,306,871 | 4/1994 | Lai | 174/65 R |

*Primary Examiner*—Kristine L. Kincaid
*Assistant Examiner*—Paramita Ghosh
*Attorney, Agent, or Firm*—Christensen O'Connor Johnson & Kindness PLLC

[57] ABSTRACT

An environmentally sealed electrical connector for use with a load cell block. The connector includes a jacketed cable that extends through a pliable connector block. The connector block is injection molded directly around the cable to insure an environmental seal between the cable and the connector block. The connector block includes a cylindrical protrusion that extends downwardly into a passageway in the load cell block. A double-sided adhesive gasket is located between the load cell block and the connector to help form an environmental seal between the connector and the load cell block and to help attach the connector to the load cell block. The connector is attached to the load cell block using four fasteners that extend through a stiff pressure plate, the connector, and are received by holes in the side of the load cell. As the fasteners are tightened, a force is placed on the pressure plate, which in turn compresses the connector block into the load cell block, establishing an environmental seal.

16 Claims, 2 Drawing Sheets

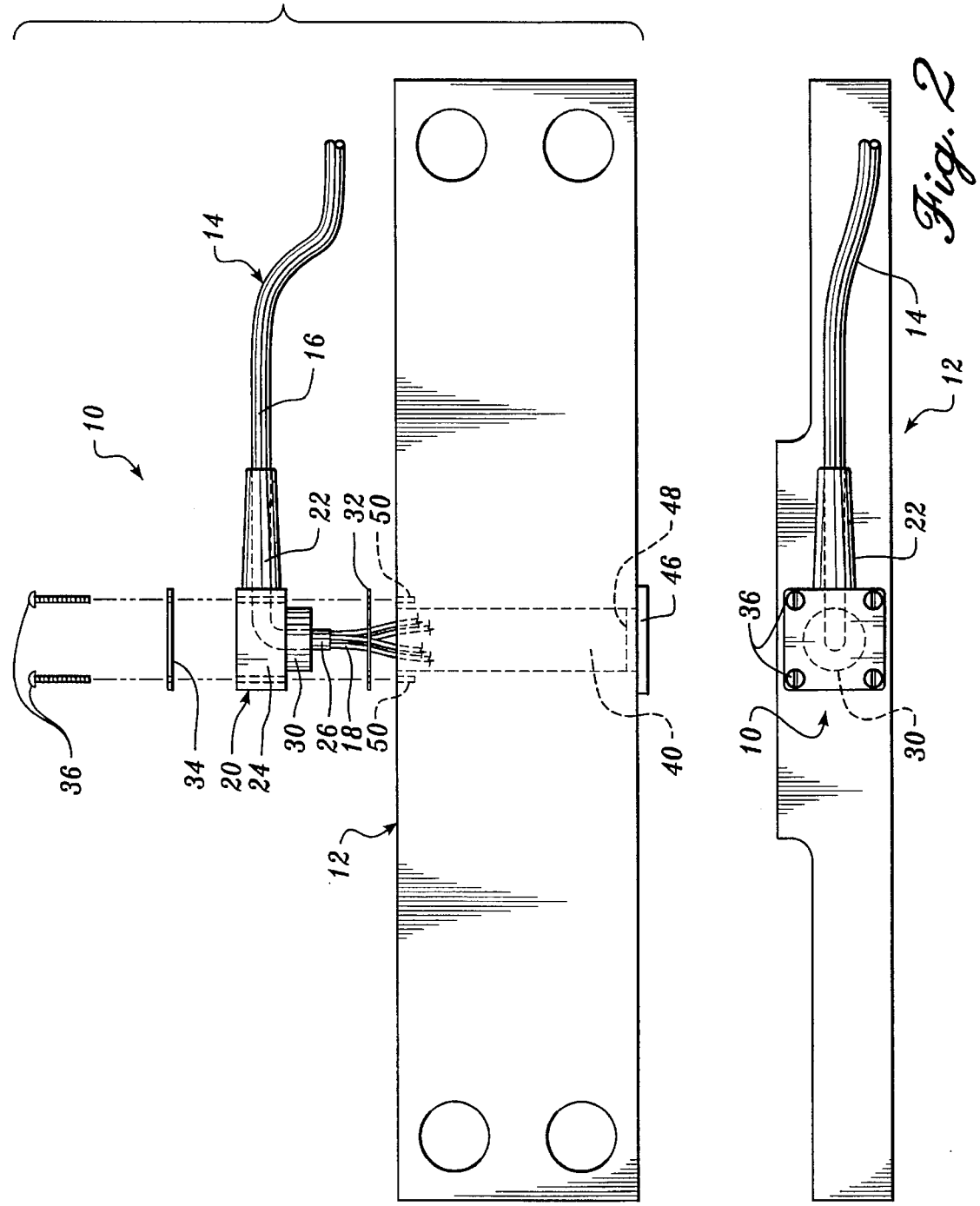

ENVIRONMENTALLY SEALED CONNECTOR FOR USE WITH A LOAD CELL BLOCK

FIELD OF THE INVENTION

The present invention relates to instrumented load cell blocks, and, more particularly to connectors for use with a load cell block.

BACKGROUND OF THE INVENTION

Load weighing systems for commercial vehicles, such as logging and other trucks, generally use a plurality of load cell assemblies to monitor the amount of weight loaded on the beds of the truck trailers. Each load cell assembly usually includes a machined load cell block that is supported between two load carrying members, such as log supports, and mounting members, such as a truck trailer frame. As an increasing load is placed on the trailer, the load cell blocks are subject to increasing deflections that are directly related to the load placed on the trailer.

Strain gauges applied to various locations on the load cell blocks and protected from damage by cover plates are used to determine the deflections of the load cell blocks as a trailer is loaded. The deflection data obtained from the strain gauges is then used to calculate the weight of the load placed on the trailer.

The strain gauges are connected to monitoring equipment that calculates and records the load placed on the trailer by wiring that is connected at one end to the strain gauges or other sensing elements, passes through an internal passageway in the load cell block, and is connected at the other end to an electrical connector mounted on the a side or end of the load cell block. The electrical connector on the side of end of the load cell block is in turn releasably connected to a mating electrical connector that includes a cable connected to the monitoring equipment.

Prior electrical connectors mounted on the load cell blocks are prone to a number of problems. Because load cell blocks are mounted on the exterior of trailers, they are exposed to harsh environmental elements including extreme temperature and moisture variations. When used on logging truck trailers, the load cell blocks and electrical connectors are also subject to extreme physical punishment from frequent contact with logs, tree limbs, etc.

In the past, it has been difficult, if not impossible, to maintain an environmental seal between the load cell block and the electrical connector mounted on the load cell block. Over time, moisture migrates through the seal between the load cell block and electrical connector and into the interior of the load cell block. Even small quantities of moisture in the interior of the load cell block can corrode or short out the strain gauges or electrical wiring within the load cell block. This moisture problem is magnified by movement and loosening of the electrical connector as the load cell block is placed under load or is vibrated during operation of the truck.

In addition to corrosion caused by moisture, the electrical connection between the load cell block and the mating electrical cable is prone to physical damage caused by contact with exterior objects. Sometimes, sufficient force is placed on the electrical cable or electrical connector to damage the connector or, in some cases, pull or knock the electrical connector entirely off of the load cell block. Prior electrical connectors extend outward normal to the surface of the load cell a sufficient distance to present a relatively large target that can be easily damaged.

In applications requiring a great deal of accuracy, the electrical connection between the load cell block and the cable is sometimes a source of errors in load measurements made using the load cell block. As with most releasable electrical connectors, sometimes a poor connection is established between the parts of the connector. Electrical connectors formed of multiple pans are also more prone to errors introduced by movement or vibration of the connector.

Thus, there exists a need for an electrical connector that reduces or eliminates some of the disadvantages of the prior electrical connectors used on load cell blocks. Specifically, there exists a need for an electrical connector that will reduce load cell failures caused by moisture or physical damage to the electrical connectors.

SUMMARY OF THE INVENTION

In accordance with the invention, an environmentally sealed electrical connector for use with a load cell block is provided. In one embodiment, the environmentally sealed connector includes an electrical cable that extends through an integral connector block molded around the electrical cable. A surface of the connector block establishes an environmental seal between the connector block and the side of a load cell block.

In accordance with other aspects of the invention, the connector block includes a protrusion extending from one surface of the connector block at least partially into a passageway in the load cell block. The connector block also includes a conical portion extending outwardly from one side. The electrical cable passes through the conical portion, into the connector block, bends through an angle of approximately ninety degrees, and exits a side of the connector block.

According to still other aspects of the invention, the connector block is formed at least partially of a pliable, resilient material. A pressure plate, located on one side of the connector block remote from the load cell block, is used to place a force on the connector block to press the connector block into the side of the load cell block to establish an environmental seal. In other embodiments of the invention, the connector block includes a cylindrical protruding portion that screws into the passageway in the load cell block. O-ring type gaskets may also be used between the connector block and the load cell block to form a seal.

Forming the connector block around the electrical cable as an integral part allows the present invention to form an environmental seal between the electrical cable and the connector block. The pliable, resilient connector block used in combination with the pressure plate allow the present invention to also form an environmental seal between the connector block and the side of the load cell block. The pliable, resilient nature of the connector block maintains the environmental seal even during vibration or slight movement of the connector relative to the load cell block.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a bottom partially exploded view of an embodiment of an environmentally sealed electrical connector formed in accordance with this invention mounted in a load cell block;

FIG. 2 is a side elevational view of FIG. 1;

FIG. 3 is a top plan view of the pressure plate of the environmentally sealed electrical connector of FIG. 1;

DETAILED DESCRIPTION OF THE PREFERRED EMBODIMENT

Figure 4:
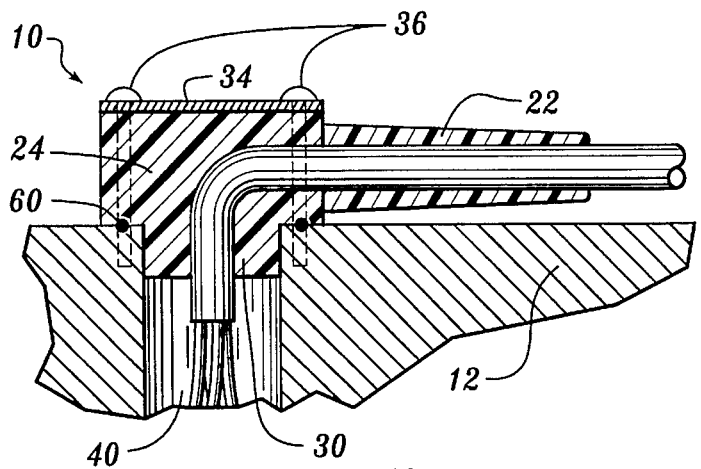
FIG. 4 is a cross-sectional view of an alternative embodiment of an electrical connector formed in accordance with this invention mounted in a load cell block.

The present invention is an environmentally sealed electrical connector for load cell blocks. FIGS. 1–3 illustrate a first embodiment of an electrical connector formed in accordance with the invention. The embodiment includes a pigtail connector 10 attached to a beam-type load cell block 12.

The deflection of the load cell block 12 is measured using electrical strain gauges (not shown) that are attached to the lower surface or other locations on the load cell block depending upon the application. The electrical strain gauges are in turn electrically connected to monitoring equipment (not shown) via an electrical cable 14 that forms part of the pigtail connector 10. The cable 14 includes a plurality of wires 18 that are connected at one end to the strain gauges. The cable leaves the load cell block 12 via a passageway 40. The cable 14 may extend to the monitoring equipment or be connected to another cable that runs to the monitoring equipment. The connections between the cable 14 and the strain gauges, and the locations of the strain gauges are not shown because they are not relevant to the disclosure of the present invention. Likewise, the connections between the cable 14 and the monitoring equipment are not shown because they are not relevant to the present invention.

The pigtail connector 10 also includes a solid one-piece seal block 20. The seal block 20 includes a truncated conical section 22 that extends outwardly approximately normal to one side of an integral rectangular section 24 and lies approximately parallel to the side of the load cell block 12 on which the connector 10 is mounted. The base of the conical section 22 is located at the rectangular section and the conical section tapers outwardly to its distal end. The seal block 20 also includes an integral cylindrical protrusion 30 that extends outwardly, generally normal to the side of the rectangular section 24 that faces the load cell block 12. The circumference of the cylindrical protrusion 30 is sized to fit snugly in the outer end of the passageway 40, as described below.

The electrical cable 14 extends longitudinally through the center of the conical section 22 into the rectangular section 24. The cable 14 then curves through angle of approximately ninety degrees and exits through the center of the cylindrical protrusion 30. The cable 14 includes a protective jacket 16 that surrounds the plurality of wires 18 that are connected to the strain gauges of the load cell. In the embodiment shown, the jacket 16 terminates at an end 26 external to the outer end of the cylindrical protrusion 30.

The seal block 20, which includes the rectangular section 24, the conical section 22, and the cylindrical protrusion 30, is formed as a single piece by placing a suitably shaped mold around the cable 14 and injecting a suitable material into the mold in a single forming operation. The material used to form seal block 20 should be capable of withstanding the harsh environment experienced by the connector 10. In addition, the material used to form the seal block 20 should be sufficiently resilient and compliant to form a good seal between the seal block 20 and the load cell block 12 when the connector 10 is attached to the load cell block, as described below. The material used to form the seal block 20 must also be compatible with the material used to form the jacket 16 of the cable 14 to ensure that a proper bond and seal are formed between the seal block and the cable 14.

In one actual embodiment of the invention, the jacket 16 of the cable 14 and seal block 20 are formed of a polyurethane material. In alternate embodiments, other materials could be used. Further, the end 26 of the jacket 14 could terminate within the cylindrical protrusion 30, rectangular section 24, or conical section 22. Obviously, the jacket 16 must extend a sufficient distance into the seal block 20 to ensure that a proper seal is created between the jacket and connector block.

In addition to the electrical cable 14 and the seal block 20, the connector 10 includes a double-sided gasket 32, a pressure plate 34 and four fasteners in the form of cap screws 36. The double-sided gasket 32 is sized to match the side of the seal block juxtaposed against the load cell block in the manner described below and the pressure plate is sized to match the opposite or outer side of the seal block 20. The double-sided gasket includes a hole (not shown) through which the cylindrical protrusion 30 passes.

As best illustrated in FIG. 3, the pressure plate 34 is rectangular in shape and is sized to correspond to the size and shape of the rectangular section 24 of the connector 10. The pressure plate 34 includes four elongated holes 52 sized to receive the screws 36. The elongated holes 52 also allow limited sidewise movement of the pressure plate 34 relative to the screws 36, thus ensuring a proper fit and relieving undue stress between the screws and pressure plate as the screws are tightened in the manner described below.

As best seen in FIG. 1, the connector 10 is attached to the side of the load cell block 12 by first feeding the wires 18 through the hole in the double-sided gasket 32 and then into the passageway 40, where the wires are connected to the strain gauges (not shown). The end of the passageway 40 opposite the end that receives the connector 10 is sealed with a plug 46 having a cylindrical protrusion 48 that extends into the passageway. In alternate embodiments, the passageway 40 may not extend all the way through the load cell block, eliminating the need for the plug 46.

The double-sided adhesive gasket 32 is sized to fit around the circumference of the cylindrical protrusion 30 such that the gasket against the outer surface of the rectangular section 24 that surrounds the protrusion. The double-sided gasket 32 and connector 10 are placed against the side of the load cell block 12 such that the cylindrical protrusion 30 extends into the passageway 40. The contact between the side of the cylindrical protrusion 30 and wall of the passageway 40 forms a first seal. A second seal is formed between the surface of the rectangular section 24 and the side of the load cell 12 by the double-sided gasket 32. It is preferred that the gasket 32 include adhesive on both sides to help insure a proper seal and to structurally bond the connector 10 to the side of load cell block 12. In other embodiments a gasket without adhesive could be used or the gasket could be eliminated altogether.

The connector 10 is attached to the side of the load cell block 12 by the four screws 36. One screw extends through one of the holes 52 located in the corners of the pressure plate 34 and then through corresponding holes located through the corners of the seal block 20. The screws are received in corresponding holes 50 in the load cell block. As described next, the pressure plate 34, which is formed of a rigid material, creates a sealing pressure.

As the screws 36 are tightened, they force the pressure plate 34 into the rectangular section 24, thus forcing the connector 10 against the side of the load cell block 12. To ensure that a relatively evenly distributed force is applied to the connector 10, as noted above, the pressure plate 34 should be formed of a suitably rigid material, for example, a metal such as steel. The rigid pressure plate 34 also prevents the screws 36 form being pulled through the compliant seal block 20 during tightening.

As the fasteners 36 are tightened further, the pressure plate 34 compresses the rectangular section 24, causing the sides of the rectangular section 24 to bow slightly outwardly. The pressure places a sufficient force on the rectangular section 24 to form a seal between the rectangular section 24, the gasket 32, and the facing side of the load cell block 12.

The structure of the connector 10 insures that a water-tight seal is created and maintained between the connector 10, the cable 14 and the load cell block 12, thus keeping moisture out of the passageway 40. Because the compliant rectangular section 24 is maintained in a compressed state by the pressure plate 34 and the screws 36, a seal is maintained even during vibrations or slight movements of the load cell block 12 relative to the connector 10. The dual attachment of the connector 10 to the side of the load cell block 12 using the double-sided adhesive gasket 32 and the screws 36 also helps to ensure that the connector 10 remains attached and sealed to the load cell block 12.

Forming the cable 14 directly into the seal block 20 such that the cable extends into the seal block 20 on one side and exits from an adjacent side produces a connector with a low profile. The low profile connector 10 helps reduce damage to the connector caused by contact with external forces, such as tree branches, etc., during operation of a truck on which the load cell block is used.

In other embodiments of the invention, the seal block 20 could be formed in other shapes or from other materials without departing from the scope of the invention. For example, the conical section 22 could protrude from the surface of the seal block 20 remote from the load cell block. As a result, the conical section would extend approximately normal to the side of the load cell block 12. In still other embodiments, the conical connector 22 could be eliminated altogether and the cable 14 could extend directly into the side or upper surface of rectangular section 24 of the seal block 20. In yet other embodiments, some electronics for the load cell block could be molded into the seal block 20.

Additional embodiments of the invention are illustrated in FIGS. 4–7. Features of the additional embodiments similar to features of the first embodiment discussed above are identified with the same reference numerals as those used in the discussion of the first embodiment. Features of the additional embodiments not discussed below function in a manner similar to the first embodiment and may be understood by reference to the discussion of the first embodiment.

In the embodiment illustrated in FIG. 4, the flat double-sided adhesive gasket 32 is replaced with an O-ring type gasket 60 that is located at the interface between the side of the load cell block 12 and the rectangular section 24 of the seal block 20. The O-ring type gasket 60 could be integrally formed as part of the rectangular block 20 or it could be a discrete part mounted in a groove in the rectangular section. The O-ring gasket could extend into a corresponding groove located in the juxtaposed surface of the load cell 12, or could be compressed into the flat surface of the load cell block 12 by the seal block 20.

Figure 5:
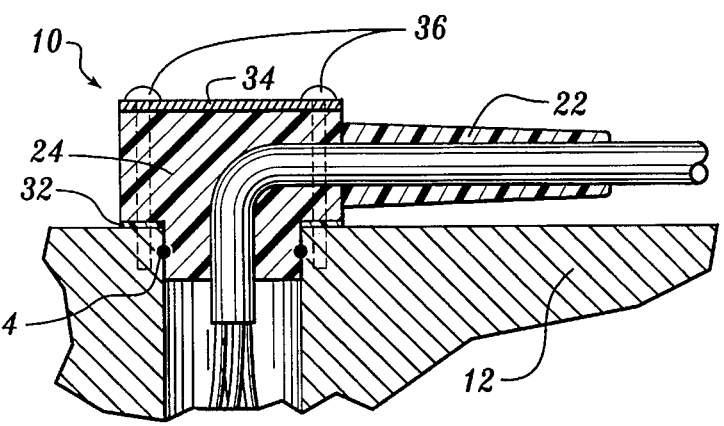
FIG. 5 is a cross-sectional view of another alternate embodiment of an electrical connector formed in accordance with this invention mounted in a load cell block.

The embodiment illustrated in FIG. 5 is similar to the first embodiment of the invention, but includes an added O-ring type gasket 64 located between the cylindrical protrusion 30 and the wall of the passageway 40. Similar to the O-ring gasket 60 of the embodiment of FIG. 4, the O-ring gasket 64 could be formed as an integral part of the cylindrical protrusion 30 or could be a discrete piece. The gasket 64 could extend into a corresponding groove formed in the wall of the passageway 40 or could be sandwiched between the wall of the passageway and the surface of the cylindrical protrusion 30.

Figure 6:
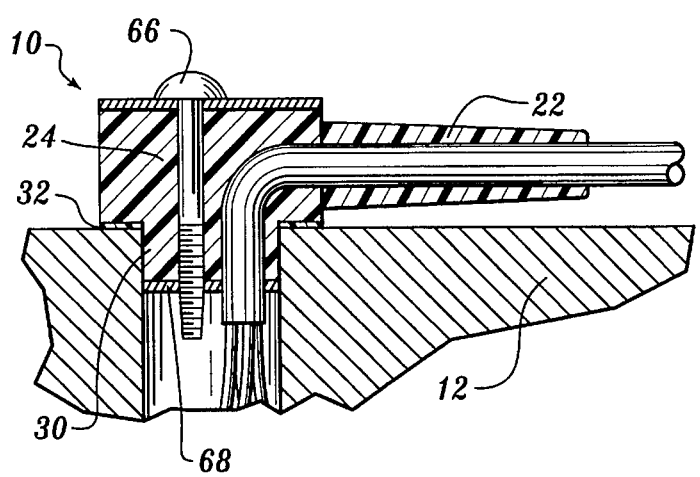
FIG. 6 is a partial cross-sectional view of another embodiment of an electrical connector formed in accordance with this invention mounted in a load cell block.

In the embodiment illustrated in FIG. 6, the plurality of screws 36 used in the first embodiment are replaced by a single threaded screw 66 that extends through the pressure plate 34, the rectangular section 24 of the seal block 20 into a threaded hole in an inner pressure plate 68. The inner pressure plate 68 is positioned against the end of the cylindrical protrusion 30. Tightening the fastener 66 causes the pressure plate 34 and the inner pressure plate 68 to move toward each other, compressing the cylindrical protrusion 30 and rectangular section 24. As the rectangular section 24 and the cylindrical protrusion 30 compress, the circumferential surface of the cylindrical protrusion 30 bulges outwardly against the wall of the passageway 40. The bulging creates sufficient frictional force between the connector 10 and the load cell block 12 to hold the connector in the load cell block. The connector 10 may also be sealed to the load cell block 12 by a double-sided adhesive gasket 32.

Figure 7:
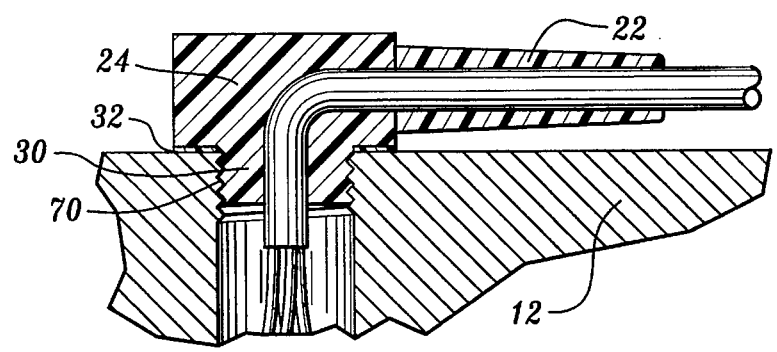
FIG. 7 is a partial cross-sectional view of yet another embodiment of an electrical connector formed in accordance with this mounted in a load cell block.

Yet another embodiment of the invention is illustrated in FIG. 7. In this embodiment, the plurality of fasteners 36, and the pressure plate 34 included in the first embodiment are eliminated. The connector 10 is attached to the load cell block 12 through the use of a double-sided adhesive gasket 32, as described above in respect to the first embodiment of the invention. In addition, the cylindrical protrusion 30 includes threading 70 that engages corresponding threading in the wall of the passageway 40. In this embodiment, the connector 10 is screwed into the passageway 40. As the connector 10 is screwed into the passageway 40, the tensile force placed on the cylindrical protrusion 30, pulls the connector 10 into contact with the side of the load cell block 12, establishing a seal. As the connector 10 is threaded into the cavity 40, a compressive force is also placed on the outer surface of the threads 70, establishing a secondary seal between the threading of cylindrical protrusion 30 and the threading of the passageway 40.

As an additive environmental seal, any of the embodiments of the invention discussed could use a sealing material, such as a silicone or other rubber or plastic material to fill the passageway 40 prior to attaching the connector to the load cell block 12. The inclusion of a sealing material further helps prevent moisture from entering the passageway 40 and corroding the wires 18.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An environmentally sealed load cell comprising:
   (a) a load cell block having a passageway extending into one surface of the load cell block;
   (b) at least one strain gauge attached to the load cell block to monitor deflections of the load cell block;
   (c) an electrical connector extending at least partially into the passageway and engaging the surface of the load cell block to establish an environmental seal between the surface of the load cell block and the connector, said connector including an electrical cable and a body formed of a pliable material molded around the electrical cable to establish an environmental seal between the electrical cable and the body of the connector, the connector including a protrusion extending outward from the side of the body of the connector and into the passageway in the load cell block, the protrusion being shaped to conform to the shape of the interior of the passageway, the electrical cable entering one side of a portion of the connector, bending through an angle of approximately 90° and exiting at an adjacent side of the portion of the connector and extending through the protrusion and into the passageway; and
   (d) attaching means for attaching the connector to the load cell block and to press the pliable body into the surface of the load cell block to form an environmental seal between the body and the surface of the load cell block.

2. The load cell block of claim 1, wherein the connector is formed at least partially of an injection molded, pliable, resilient material that extends around the cable.

3. The load cell block of claim 1, wherein the attaching means comprises a pressure plate and a fastener, the pressure plate located adjacent one side of the body and being pressed toward the surface of the load cell block by the fastener to place a force on a pliable portion of the body of the connector to maintain the connector adjacent the load cell block to establish an environmental seal between the body and the surface of the load cell block.

4. The load cell of claim 3, wherein the pressure plate is located adjacent a surface of the connector opposite a surface of the connector adjacent the load cell block.

5. The load cell of claim 1, wherein the connector includes a gasket located between a surface of the connector adjacent the load cell block and the surface of the load cell block.

6. The load cell of claim 5, wherein the gasket is an O-ring type gasket.

7. The load cell of claim 1, wherein the means for attaching the connector includes a threaded portion that screws into the passageway.

8. The load cell of claim 1, wherein the connector includes a first pressure plate located adjacent one surface of the connector a second pressure plate located adjacent an opposite surface of the connector, and a fastener extending through the connector between the first pressure plate and the second pressure plate, such that movement of the fastener compresses the body of the connector between the first pressure plate and the second pressure plate to force the body of the connector into contact with the load cell to form the environmental seal.

9. An environmentally sealed load cell comprising:
   (a) a load cell block having a passageway extending into one surface of the load cell block;
   (b) at least one strain gauge attached to the load cell block to monitor deflections of the load cell block; and
   (c) an electrical connector attached to the surface of the load cell block and extending at least partially into the passageway to establish an environmental seal that seals the passageway, the electrical connector including a body formed of a pliable material, a protrusion extending outward from one side of the body and into the passageway, and an electrical cable extending inside the sides of the body, bending approximately 90° and extending through the protrusion and into the interior of the passageway, the protrusion being shaped to fit within the passageway and contact an interior surface of the passageway to form a seal, and the electrical cable being attached to said strain gauge.

10. The load cell of claim 9, wherein the electrical connector further comprises a pressure plate located adjacent a surface of the connector opposite a surface of the connector adjacent to the load cell block, the pressure plate being forced towards the surface of the load cell block by a fastener to place a compressive force on the electrical connector to compress the body into the surface of the load cell block to establish an environmental seal between the electrical connector and the load cell block.

11. The load cell of claim 10, wherein the electrical connector further comprises a second pressure plate located inside the passageway adjacent a surface of the protrusion, and wherein the fastener extends between the pressure plate and the second pressure plate such that movement of the fastener compresses the body of the connector between the pressure plate and the second pressure plate to force the body of the connector into contact with the surface of the load cell and to force an exterior surface of the protrusion into contact with the interior surface of the passageway to form an environmental seal.

12. The load cell of claim 10, wherein the fastener extends through the pressure plate and into the load cell block.

13. The load cell of claim 9, wherein the protrusion is threaded and wherein the interior of the passageway is threaded and the protrusion is threaded into the interior of the passageway.

14. The load cell block of claim 9, further comprising a gasket located between the electrical connector and the load cell block.

15. An environmentally sealed load cell comprising:
   (a) a load cell block having a passageway extending into one surface of the load cell block;
   at least one strain gauge attached to the load cell block to monitor deflections of the load cell block;
   (c) an electrical connector extending at least partially into the passageway and engaging the surface of the load cell block to establish an environmental seal between the surface of the load cell block and the connector, said connector including an electrical cable, a body formed of a pliable material molded around the electrical cable to establish an environmental seal between the electrical cable and the body of the connector and a gasket located between the surface of the connector adjacent to the load cell block and the surface of the load cell block; and
   (d) attaching means for attaching the connector to the load cell block and to press the pliable body into the surface of the load cell block to form an environmental seal between the body the surface of the load cell block.

16. An environmentally sealed load cell comprising:
   (a) a load cell block having a passageway extending into one surface of the load cell block;
   (b) at least one strain gauge attached to the load cell block to monitor deflections of the block; and (c) an electrical connector extending at least partially into the passageway and engaging the surface of the load cell block to establish an environmental seal between the surface of the load cell block and the connector, said connector including an electrical cable and a body formed of a pliable material molded around the electrical cable to establish an environmental seal between the electrical cable and the body of the connector, the connector also including attaching means for attaching the connector to the load cell block and to press the pliable body into the surface of the load cell block to form an environmental seal between the body and the surface of the load cell block, the attaching means including a first pressure plate located adjacent one surface of the connector, a second pressure plate located adjacent an opposite surface of the connector, and a fastener extending through the connector between the first pressure plate and the second pressure plate, such that movement of the fastener compresses the body of the connector between the first pressure plate and the second pressure plate to force the body of the connector into contact with the load cell to form an environmental seal.

* * * * *